US009567083B2

(12) United States Patent
Saeltzer et al.

(10) Patent No.: US 9,567,083 B2
(45) Date of Patent: Feb. 14, 2017

(54) MODULAR ON-BOARD GALLEY, IN PARTICULAR AIRCRAFT GALLEY, AND METHOD FOR ASSEMBLY

(75) Inventors: Steffen Saeltzer, Mittenaar (DE); Andreas Claas, Herbornseelbach (DE)

(73) Assignee: SELL GMBH, Herborn (DE)

( * ) Notice: Subject to any disclaimer, the term of this patent is extended or adjusted under 35 U.S.C. 154(b) by 134 days.

(21) Appl. No.: 14/000,226

(22) PCT Filed: Jan. 25, 2012

(86) PCT No.: PCT/EP2012/000314
§ 371 (c)(1),
(2), (4) Date: Sep. 30, 2013

(87) PCT Pub. No.: WO2012/113499
PCT Pub. Date: Aug. 30, 2012

(65) Prior Publication Data
US 2014/0034782 A1    Feb. 6, 2014

(30) Foreign Application Priority Data

Feb. 22, 2011   (DE) .................. 10 2011 011 961

(51) Int. Cl.
*B64D 11/00*    (2006.01)
*B64D 11/04*    (2006.01)

(52) U.S. Cl.
CPC .......... *B64D 11/04* (2013.01); *Y10T 29/49826* (2015.01)

(58) Field of Classification Search
CPC ................. B64D 11/04; B64D 11/0007; B64D 2011/0046; A47B 81/00; A47B 87/008; A47B 96/00; A47B 47/0091; A47B 47/042; A47B 53/02; A47B 87/00; A47B 87/0276; A47B 67/04; A47B 87/007; A47B 87/02; A47B 88/20

(Continued)

(56) References Cited

U.S. PATENT DOCUMENTS 1,928,936 A * 10/1933 Henricson ..................... 312/195
3,087,767 A *  4/1963 Schell ........................... 312/240

(Continued)

FOREIGN PATENT DOCUMENTS

| CN | 200720175549 | | 6/2008 | |
|---|---|---|---|---|
| DE | 102006023047 | A1 * | 11/2007 | ............. B64D 11/04 |
| WO | WO 2009/065772 | * | 5/2009 | ............. B64D 11/00 |

*Primary Examiner* — Brian M O'Hara
*Assistant Examiner* — Assres H Woldemaryam
(74) *Attorney, Agent, or Firm* — Andrew Wilford

(57) ABSTRACT

The invention relates to a modular on-board galley, in particular an aircraft galley (11), and a method of assembling such a galley that comprises, as utility zones, a base and at least one attachment element divided into compartments for accommodating drawers and devices, the compartments being designed with mechanical connectors for interconnecting the elements and with inserts or devices as well as electrical and electronic device connectors and device supply lines. Such a modular on-board galley that not only offers a variable structure but also enables the galley to be completely assembled in a simple manner with preassembled space-saving block- and housing-like attachments and superstructures that are nevertheless compact with regard to their dimensions, in particular in an aircraft that is fully equipped with seats, cabinets and on-board toilets, without these installed components having to be removed beforehand, is to be created. For this purpose, a backer element (2) to the rear as seen from the operating side (7) of the galley is designed for extension laterally as well as forwardly and rearwardly projecting individual housing-like attachments around the backer element and upwardly projecting attachments on top of the backer element, the attachments being attached successively, the backer element (2) having a horizontal connection plane (H) and vertical connection planes (LL, LQ) that run both in the longitudinal direction and in the transverse direction.

5 Claims, 4 Drawing Sheets

(58) Field of Classification Search
USPC .......... 244/118.1, 118.5, 119; 312/107, 108,
312/198, 201, 249.4, 249.8, 249.9, 249.5,
312/249.6, 249.12, 249.13
See application file for complete search history.

(56) References Cited

U.S. PATENT DOCUMENTS

| | | | | |
|---|---|---|---|---|
| 3,563,624 | A * | 2/1971 | Stice | 312/111 |
| 4,478,467 | A * | 10/1984 | Tyndall | 312/249.9 |
| 6,053,588 | A * | 4/2000 | Biggel et al. | 312/249.8 |
| 6,663,202 | B2 * | 12/2003 | Spann | 312/249.12 |
| 7,500,684 | B2 * | 3/2009 | Van Loon et al. | 280/79.3 |
| 7,562,949 | B1 * | 7/2009 | Nielsen | 312/7.2 |
| 7,780,114 | B2 | 8/2010 | Doebertin | |
| 8,770,517 | B2 * | 7/2014 | Boren et al. | 244/118.5 |
| 2001/0003960 | A1 * | 6/2001 | Lininger et al. | 108/50.01 |
| 2005/0217540 | A1 * | 10/2005 | Novak | 108/50.01 |
| 2005/0230540 | A1 * | 10/2005 | Harrington et al. | 244/118.2 |
| 2006/0145442 | A1 | 7/2006 | Van Loon et al. | |
| 2007/0125012 | A1 * | 6/2007 | Quigley et al. | 52/167.1 |
| 2007/0228216 | A1 * | 10/2007 | Wenstrom | 244/118.5 |
| 2008/0001031 | A1 | 1/2008 | Doebertin et al. | |
| 2008/0129159 | A1 * | 6/2008 | Johnson et al. | 312/111 |

\* cited by examiner

MODULAR ON-BOARD GALLEY, IN PARTICULAR AIRCRAFT GALLEY, AND METHOD FOR ASSEMBLY

CROSS REFERENCE TO RELATED APPLICATIONS

This application is the US-national stage of PCT application PCT/EP2012/000314 filed 25 Jan. 2012 and claiming the priority of German patent application 102011011961.2 itself filed 22 Feb. 2011.

FIELD OF THE INVENTION

The invention relates to a modular on-board galley, in particular aircraft galley which comprises, as utility zones, a base and at least one attachment element divided into compartments for accommodating drawers and devices, which compartments are designed with mechanical connectors for interconnecting the elements and with inserts or devices as well as electrical and electronic device connectors and device supply lines. Furthermore, the invention relates to a method of assembling a modular on-board galley.

BACKGROUND OF THE INVENTION

Such a modular on-board galley has been disclosed in DE 10 2006 023 047 [U.S. Pat. No. 7,780,114]. It comprises a plurality of vertical and horizontal structural elements and utility zones formed thereby for accommodating drawers, inserts or devices. First structural elements form a base with connecting elements for the mechanical connection of second structural elements, attachments, inserts, devices and/or drawers that are variable and on which are provided interfaces for supplying devices to be accommodated in the on-board galley.

The utility zones so created are closed on two opposite sides and are accessible or can be operated from the front for accommodating drawers, devices or inserts. An attachment element that can be subdivided or partitioned into compartments is provided on the first structural element or base. The integral connecting elements are used for mechanically connecting inserts or devices and the interfaces for supplying devices with electricity or water or for transferring data and information or for some other kind of supply or disposal.

Although this known on-board galley is variable and facilitates changing of the attachments, inserts, devices and/or drawers with one another, an extraordinarily large number of vertical and horizontal structural elements are required to achieve this variability.

OBJECT OF THE INVENTION

The invention is therefore based on the object of creating a modular on-board galley of the above-described kind that not only offers a variable structure but also enables the galley to be completely assembled in a simple manner with preassembled space-saving block and housing-like attachments and superstructures that are nevertheless compact with regard to their dimensions, in particular in an aircraft that is fully equipped with seats, cabinets and on-board toilets, without these installed components having to be removed beforehand. Furthermore, an object of the invention to provide a method of assembling a modular on-board galley.

SUMMARY OF THE INVENTION

According to the invention, this object is achieved in that a backer element, which is to the rear as seen from the operating side of the galley, is designed for extension laterally as well as forwardly and rearwardly by projecting individual housing-like attachments around the backer element and upwardly projecting attachments on top of the backer element, the attachments being attached successively, the backer element having a horizontal and vertical connection planes that run both in the longitudinal direction and in the transverse direction. As a result of the concept with a plurality of connection planes, the backer element that, starting from a rear wall, preferably has a U-shaped box structure with vertical outer walls and a top wall and is open at the front on the operating side of the galley, allows the assembly sequence to be improved thanks to block-like supplementary attachments that extend the backer element forward, rearward, upward and to the sides. Its dimensions can be defined such that the components can also be easily brought into the interior of the aircraft as individual components for final assembly through a door that is positioned further back in the aircraft body and is therefore correspondingly narrower.

A preferred embodiment of the invention provides that a maintenance flap is formed in the rear wall of the backer element. As the connection plane concept of the backer element enables extension around and above without adversely affecting the rear wall that remains open at the rear and is not obstructed, the personnel can carry out necessary maintenance work behind the on-board galley without having to move it.

According to an advantageous embodiment of the invention, rearwardly projecting braces are flush with the top wall and at the top of the rear wall. The block-like superstructures that extend the backer element rearward and upward can be placed thereon without at the same time blocking the rear wall.

Another proposal provides that, according to the invention, a base attachment is at the front of the backer element, is supported on the floor by lateral side walls, and is subdivided by vertical partitions. Drawers or the like with rollers that run on the floor can be fitted in any way in the thus formed individual compartments of the base attachment.

A method of assembling a modular on-board galley according to the invention provides that the backer element can be successively built around and built on as follows by:

providing a base attachment at the vertical connection plane in the longitudinal direction of the backer element and connecting the base attachment to the backer element with a top cover panel of the base attachment flush to the front edge of the top wall of the backer element and further providing compartment-forming attachments that overhang the backer element on both sides in the longitudinal direction and are covered from above by the cover panel, providing an upper-level compartment-forming attachment at the horizontal connection plane of the backer element resting on its braces and connecting the upper-level compartment-forming attachment to the backer element, installing on the cover panel and connecting to the cover panel of first and second upper-level compartment-forming front structures that are located in front of the upper-level compartment-forming attachment on the operating side of the galley and that are designed on each of its outer sides with lateral upper compartment-forming attachments that supplement the overhang the lower compartment-forming attachments, enclosing the surrounding structures and superstructures on the operating side of the galley by a border frame that is matched to the shape thereof.

This enables the modular on-board galley to be assembled fully autonomously as well as maintained and also reconfigured without aircraft fittings such as seats, on-board toilets or cabinets having to be removed beforehand in order to create free installation space.

It is understood that drawers, devices or the like are then integrated into the fully assembled on-board galley equipped with all necessary connectors.

BRIEF DESCRIPTION OF THE DRAWING

Further characteristics and details of the invention can be seen from the claims and the following description of an embodiment of the invention shown in the drawings. In the drawings:

SPECIFIC DESCRIPTION OF THE INVENTION

Figure 1:
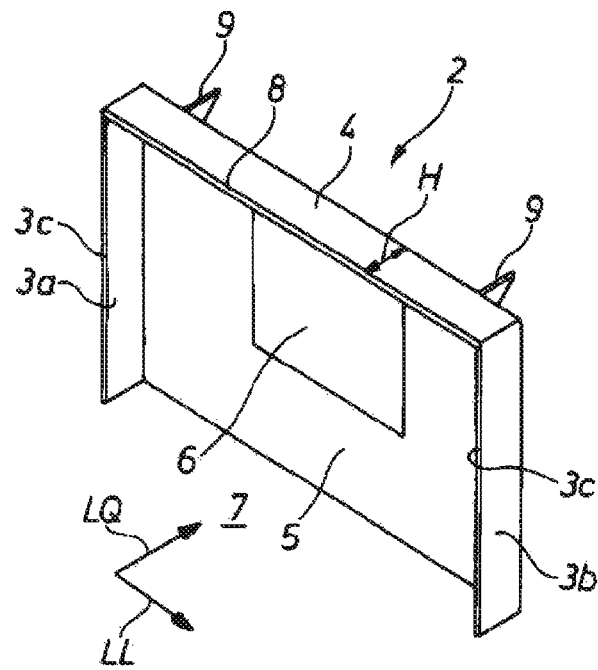
FIG. 1 is a perspective overall view of a backer element having a U-shaped box structure seen from the front side open toward the operating or front side of the galley.
Figure 7:
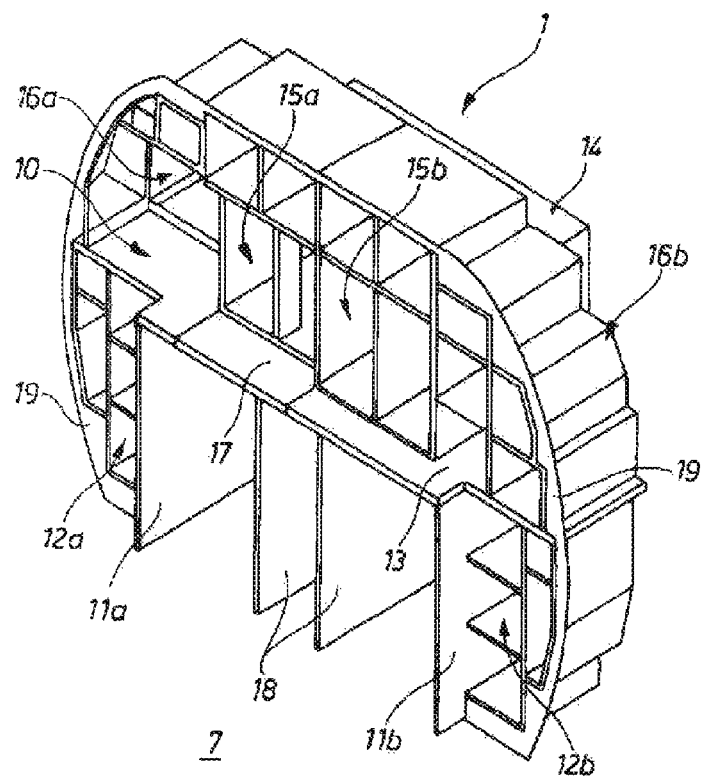
FIG. 7 is a perspective overall view of the components of FIG. 6 completed by a border frame in a perspective overall view.

The modular aircraft galley 1 shown in FIG. 7 as a totality after final assembly without drawers, devices or the like is built on a backer element 2 having a U-shaped box structure as a starting component shown in FIG. 1. This has vertical outer or side walls 3a and 3b, a top wall 4 and a rear wall 5 with a maintenance flap 6 provided therein, the backer element 2 being open to the front to an operating side 7 of the galley (see FIG. 7) and being supported on the floor by its outer walls 3a and 3b and the rear wall 5.

For extension laterally, forward, upward, and rearward, there are projecting individual block- or housing-like attachments that are described below surrounding the backer element and upwardly projecting attachments on top of the backer element, the backer element 2 forming a horizontal connection plane H extending in the direction of the double arrow with the upper surface of the top wall 4, and perpendicular connection planes LL and LQ that run both in the longitudinal and transverse directions according to the arrows and formed by the outer surfaces of the outer walls 3a and 3b as well as the front edge 8 of the top wall 4 and the front edges 3c of the outer walls 3a and 3b. For the purpose of extension to the rear of the backer element 2, it also has rearwardly projecting braces 9 that are level with the top wall 4 at the upper end of the rear wall 5.

Figure 2:
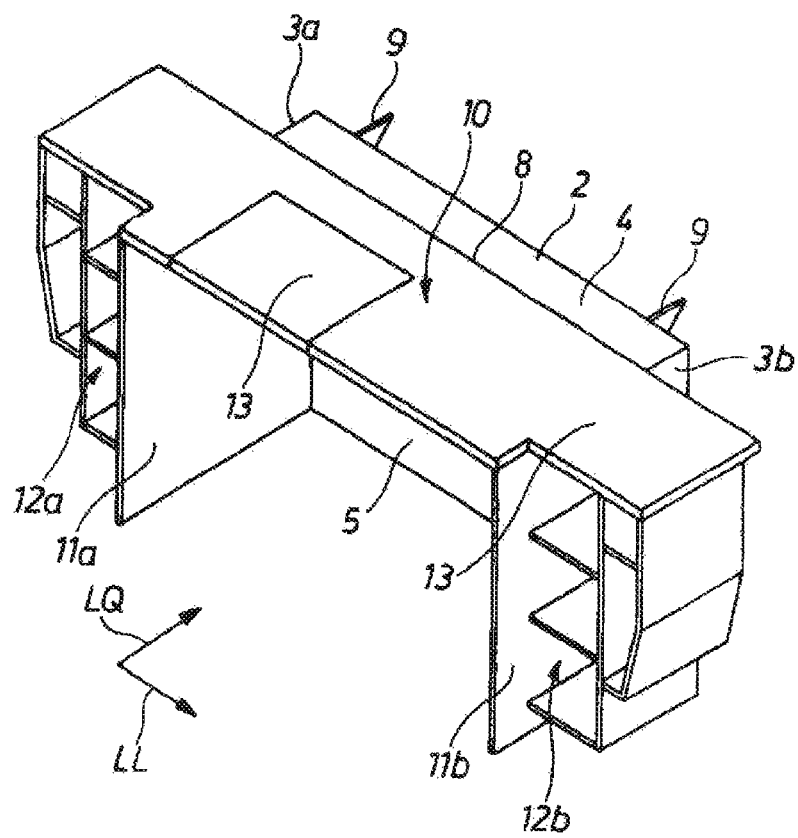
FIG. 2 is a perspective overall view of the backer element of FIG. 1 with base attachments fitted at the front.

FIG. 2 shows a base attachment 10 that is arranged at the open front on the operating side 7 of the galley on a longitudinal connection plane LL of the backer element 2, and that is connected to the backer element 2 by unillustrated connectors. Here, it comprises two outer side walls 11a and 11b and laterally projecting compartment-forming lower attachments 12a and 12b that are cantilevered longitudinally from the ends of the backer element 2, and a cover panel 13 that bridges the side walls 11a and 11b at the top while at the same time covering the compartment-forming lower attachments 12a and 12b and connecting flush to the front edge 8 of the top wall 4 of the backer element 2.

Figure 3:
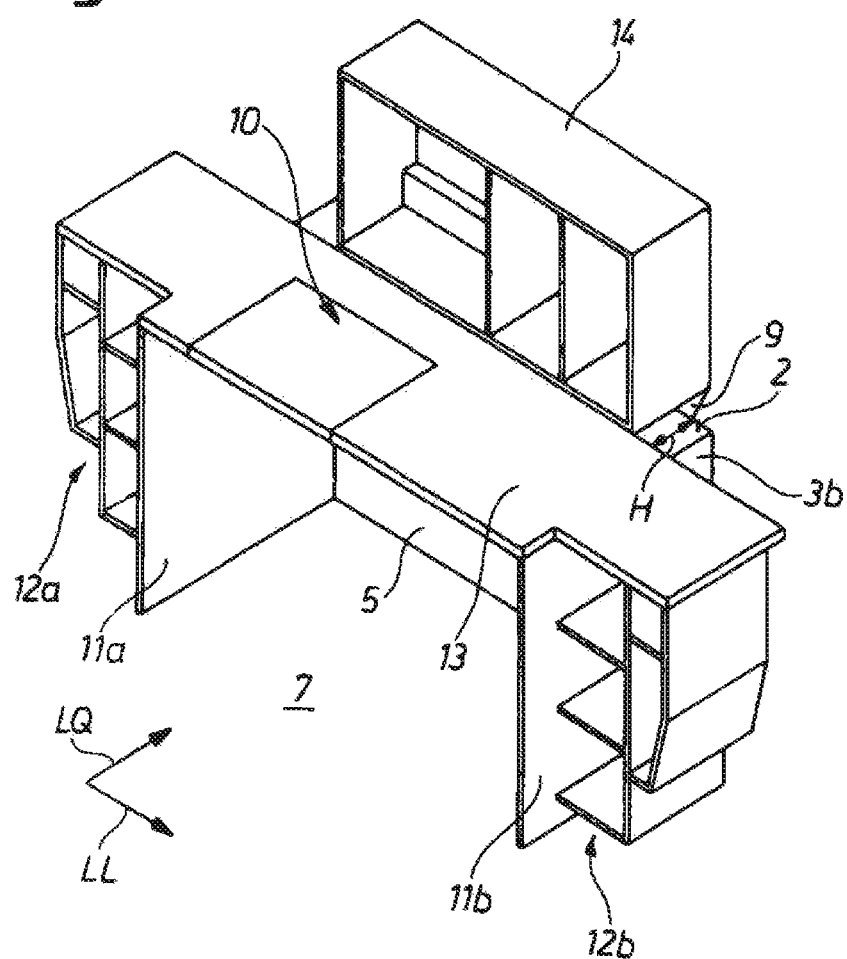
FIG. 3 is a perspective overall view of the components of FIG. 2 supplemented by an upper-level compartment-forming attachment.
Figure 4:
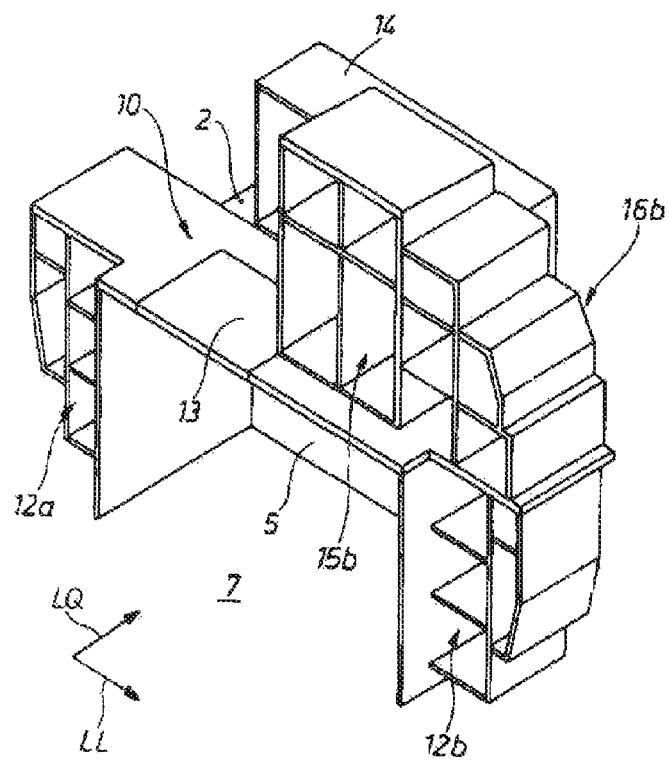
FIG. 4 is a perspective overall view the components of FIG. 3 supplemented by an upper-level compartment-forming front structure with lateral compartment-forming attachment.

According to FIG. 3, the assembly of FIG. 2 has been supplemented by a rear upper-level compartment-forming attachment 14 that stands at the horizontal plane H on the top wall 4 of the backer element 2 resting on its braces 9 and that, like the backer element 2, forms perpendicular longitudinal and transverse connection planes LL and LQ. Of these, the longitudinal connection plane LL is used to fit a first upper-level compartment-forming front structure 15b (FIG. 4) and a second upper-level compartment-forming front structure 15a on the cover panel 13 of the base attachment 10 and to connect them to the base attachment 10 in front of the upper-level compartment-forming rear attachment 14 at the cover panel 13. The optional upper-level compartment-forming front structures 15a and 15b that can also be designed in one piece, are connected to or provided with lateral upper compartment-forming attachments 16a and 16b that are above the lower compartment-forming attachments 12a and 12b of the base attachment 10 and are fixed to the cover panel 13 and/or the associated upper-level compartment-forming front structures 15a and 15b.

Figure 5:
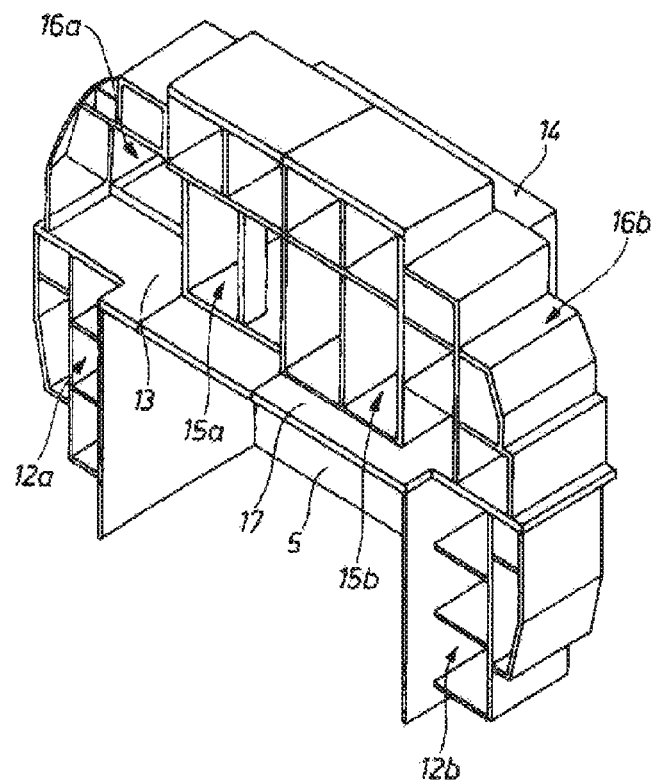
FIG. 5 is a perspective overall view of the components of FIG. 4 supplemented by a further upper-level compartment-forming front structure with lateral compartment-forming attachment in a perspective overall view.
Figure 6:
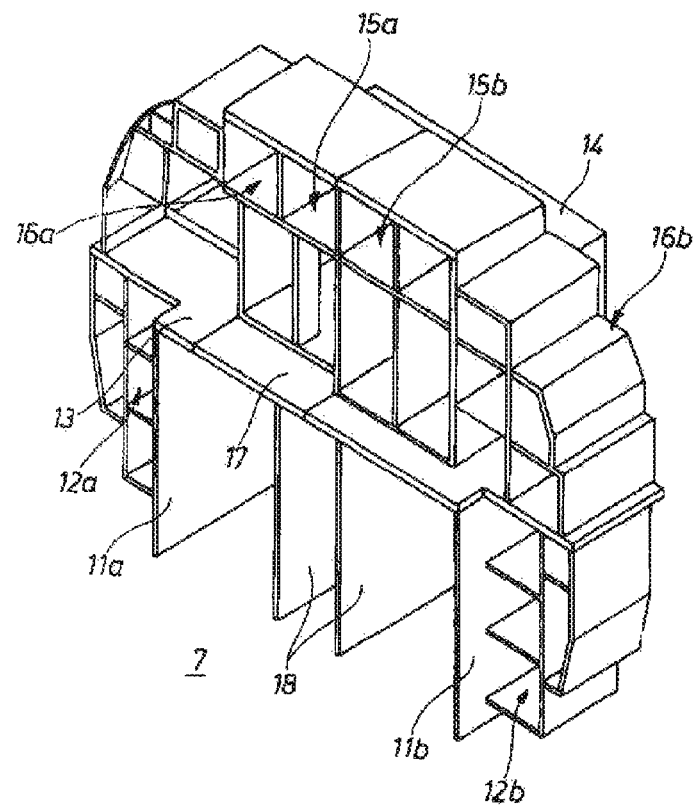
FIG. 6 is a perspective overall view of the components of FIG. 5 with subdivision of the base attachment by vertical partitions in a perspective overall view.

As shown in FIGS. 5 and 6, a countertop 17 that here extends from the bottom edges of the upper-level compartment-forming front structures 15a and 15b to the operating side 7 of the galley can be provided on the cover panel 13 of the base attachment 10. FIG. 6 further shows that the base attachment 10 can be subdivided by vertical partitions 18 into compartments for unillustrated drawers. According to FIG. 7, the on-board galley 1, which is assembled in a modular fashion from individual block or housing-like components that are easy to handle even in restricted space conditions by horizontally and upwardly extending from the backer element and its connection planes, is enclosed on the operating side 7 of the galley by a border frame 19 that fits the shape of the surrounding structures and superstructures.

The invention claimed is:

1. A modular on-board aircraft galley comprising:
a backer element forming an upper horizontal connection plane, a pair of longitudinally spaced side vertical connection planes perpendicular to the horizontal connection plane, and a vertical front connection plane perpendicular to the horizontal and side connection planes;
a front base attachment divided into compartments and secured to the backer element forward of the front connection plane and below the horizontal connection plane;
two side attachments divided into compartments, flanking the front base attachment, and secured to the front base attachment forward of the front connection plane, below the horizontal connection plane, and at the side connection planes;
a rear upper attachment divided into compartments and attached atop the backer element at and above the upper horizontal connection plane and rearward of the front connection plane;
an upper-level compartment-forming front structure attached atop the front base attachment, forward of the front connection plane and of the rear upper attachment, and between the side planes; and two upper compartment-forming attachments flanking the upper level compartment-forming front structure above the horizontal connection plane, forward of the front connection plane, and above the side attachment.

2. The on-board galley defined in claim 1, wherein the backer element has a rear wall from which extends a U-shaped forwardly open box structure formed by vertical outer walls and a top wall.

3. The on-board galley defined in claim 2, wherein the rear wall has a maintenance flap.

4. The on-board galley defined in claim 2, further comprising:

rearwardly projecting braces level with the upper plane at an upper edge of the rear wall.

5. The on-board galley defined in claim 1, wherein the base attachment in front of the backer element has side walls supported on a floor and vertical compartment-forming partitions.

* * * * *